June 15, 1937. L. J. MORGAN 2,083,657
BUMPER CONSTRUCTION FOR AUTOMOBILES OR FOR OTHER AUTOMOTIVE VEHICLES
Filed May 2, 1933 3 Sheets-Sheet 3
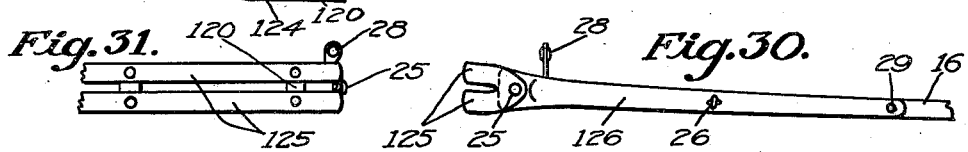
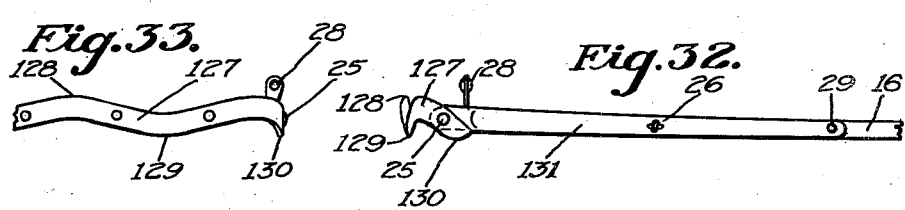
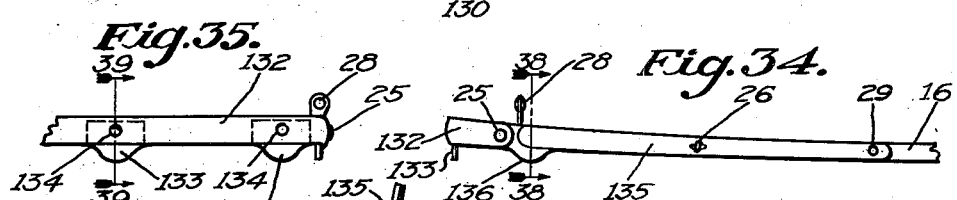
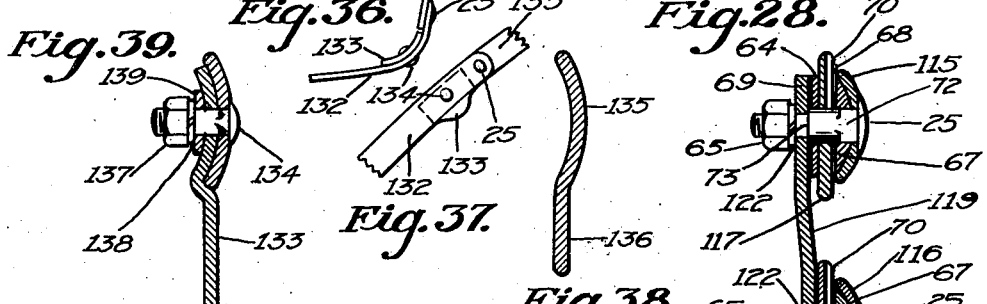
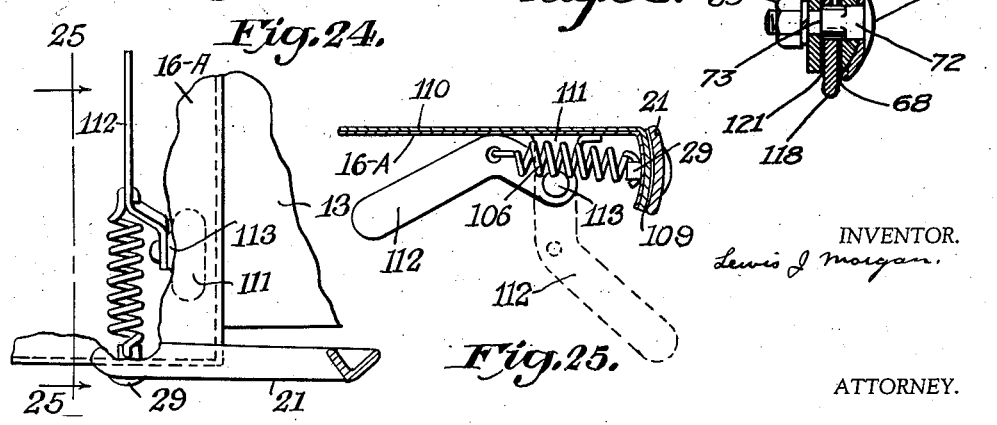
INVENTOR.
Lewis J. Morgan.
ATTORNEY.

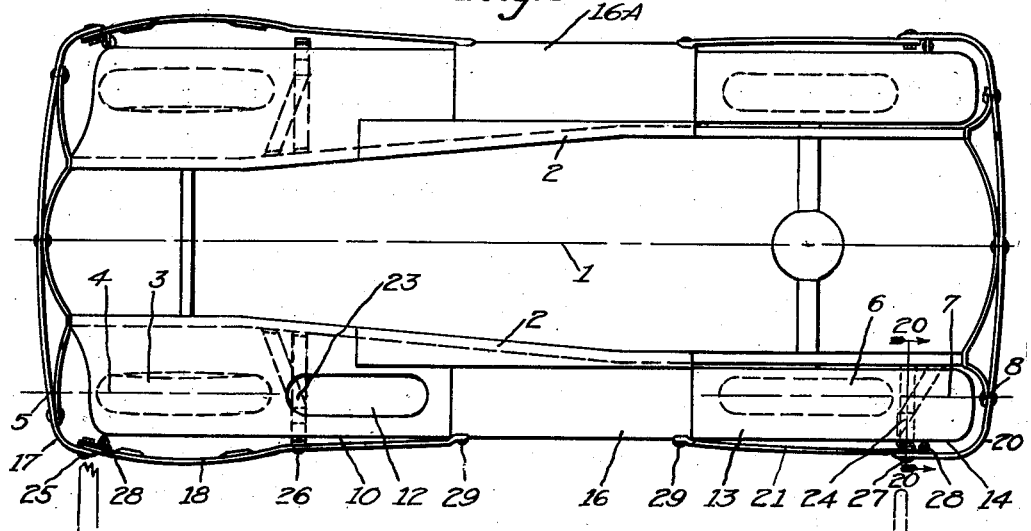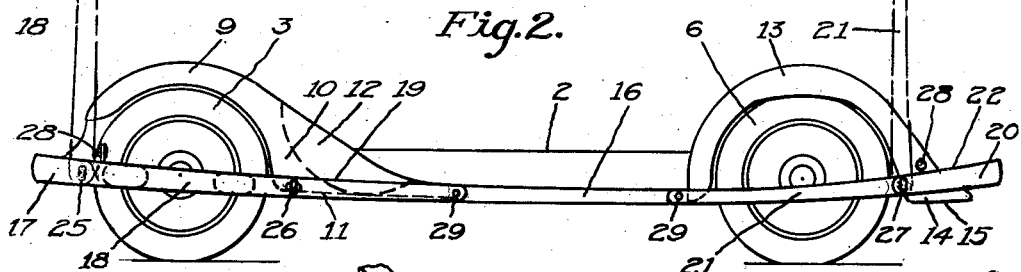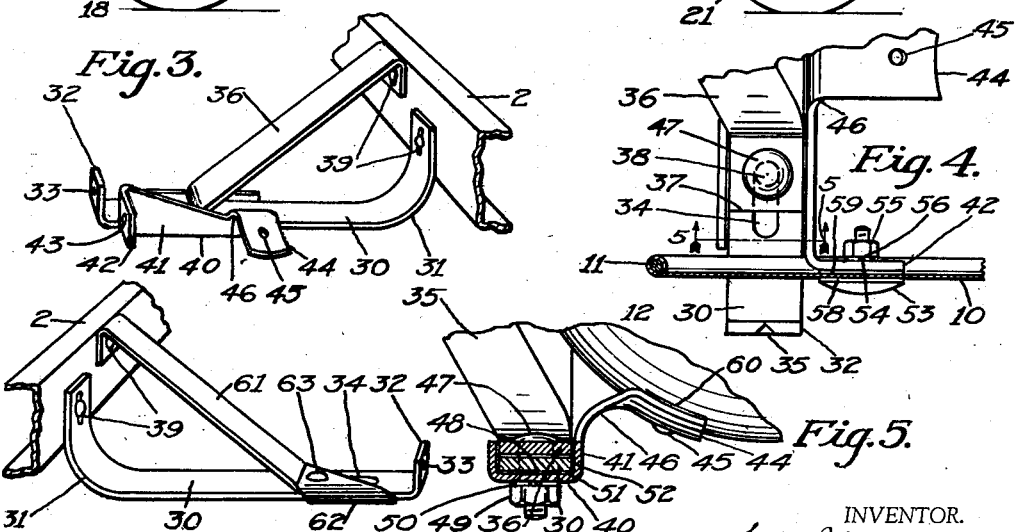

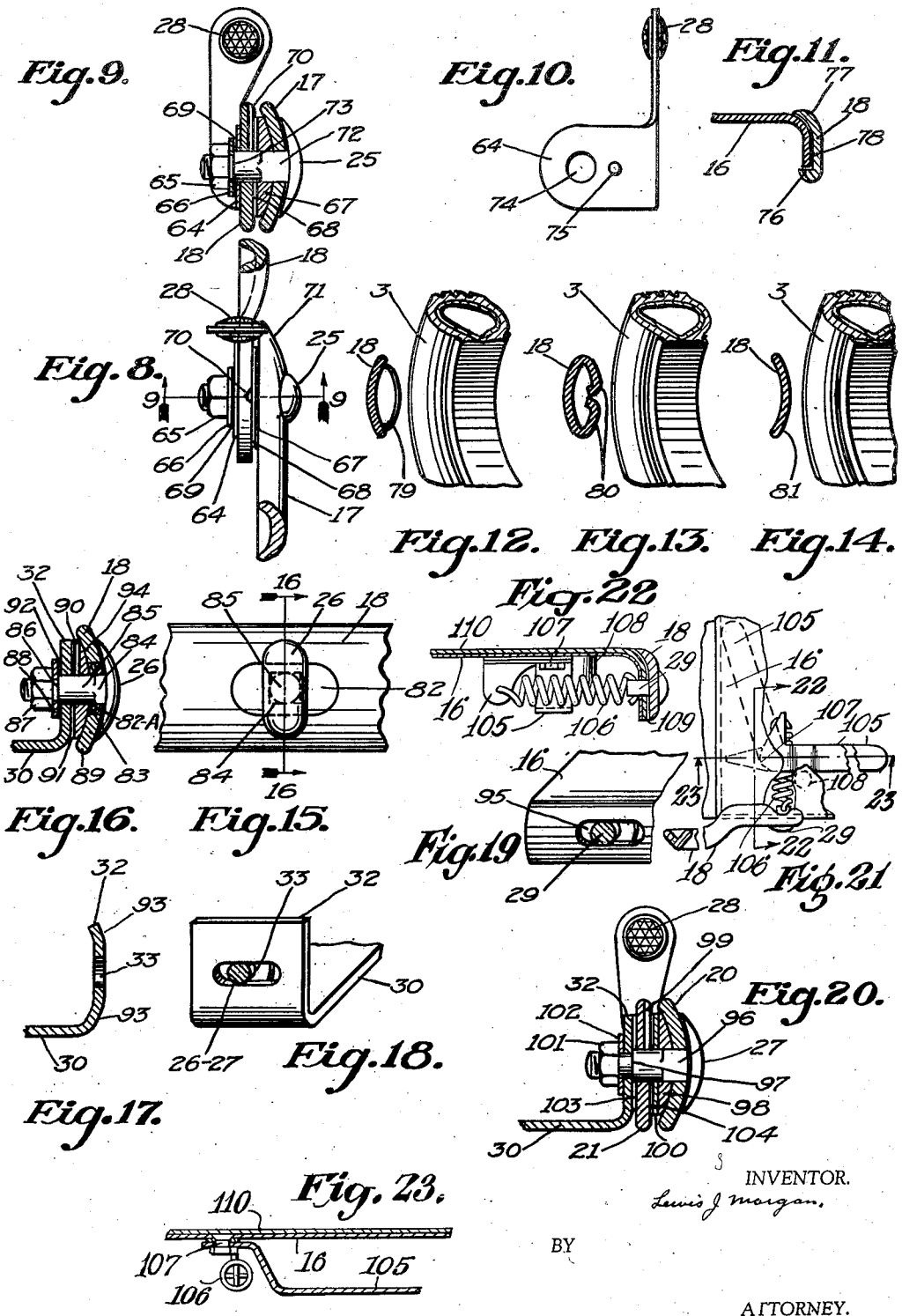

Patented June 15, 1937

2,083,657

UNITED STATES PATENT OFFICE 2,083,657

BUMPER CONSTRUCTION FOR AUTOMOBILES OR FOR OTHER AUTOMOTIVE VEHICLES

Lewis J. Morgan, Syracuse, N. Y.

Application May 2, 1933, Serial No. 668,979

9 Claims. (Cl. 293—55)

This invention relates to bumpers for automobiles and the like and has for its object a bumper construction for protecting the automobile at either or both of its ends and for a distance along its sides from its ends.

It further has for its object a bumper construction of this type having the impact surface thereof so located at the corners of the vehicle or chassis relatively to the mud guards and wheels, as to receive the impact force of head-on and side collisions over a wide or high surface and transfer it through the side members of the bumper to the chassis and relieve the wheels, axles, mud guards, etc. of such forces.

It further has for its object a bumper construction including a transverse member and side members in which the side members are mounted to have a resilient yielding movement both lengthwise of the automobile or the chassis and transversely in a direction at a right angle to the longitudinal plane of the vehicle.

It further has for its object a bumper construction in which either or both the front and rear transverse bumper members curve around the corners of the chassis and to the ends of which the side bumper members are so connected as to be shifted upward to make the tires accessible, when the side members are detached from the chassis and running boards.

It also has for its object a bumper construction of this type with side extensions which are readily demountable for the purpose of giving access to the wheels to change tires, etc.

Other objects will appear throughout the specification.

This bumper construction comprises, generally, a member extending transversely of one end, as the front or rear end of an automobile and having its end portions curved at the corners of the vehicle from substantially a point in advance of the adjacent mud guard and in line with the plane of the adjacent front wheel, around to the outer side of the wheel to a point in a transverse vertical plane of the front edge of the tire of the wheel or near the transverse vertical plane of the front edge of the mud guard, and side members forming side extensions of said curved ends and being resiliently secured to the chassis beneath the mud guards and independently of the mud guards and also secured at their rear ends to the edges of the running board or anything occupying the position of the edges of the running boards. The points of securement of the side extensions are resilient to permit the side extensions to move in a lengthwise direction relatively to the chassis and the running boards and also to yield in a direction transversely of the vehicle at the intermediate point where the side members are secured to the chassis independently of the mud guards. Also, the curved ends of the transverse members act to yieldingly resist impact force in directions lengthwise and crosswise of the vehicle. The side members are connected to the extreme ends of the curved end portion of the transverse members by a pivotal joint, the axis of which extends transversely to be moved upward into vertical position, when demounted from the chassis and the running boards.

The vehicle may be equipped with a rear transverse bumper with side extensions but as the rear wheels do not turn for steering purposes, the relative position of the curve of the end portion of the rear transverse bumper member is not exactly the same as that of the front bumper to the front wheels which are turned to steer the vehicle, but the curve of the end portions of the rear bumper to the rear edge of the rear mud guard is substantially the same as the curve of the end portions of the front member of the transverse bumper member to the front edge of the front mud guard.

In order that the side members may be readily displaced or be completely detached from the transverse members for the purpose of giving access to the wheels to change tires, etc., the side bumper members are secured only at their ends to the companion transverse member and are detachable readily from the chassis and the running board. The side members are secured between their ends to the chassis and the running board by means which are quickly releasable and when released permitting the side member to be lifted into vertical position about the points of attachment to the ends of the transverse members in order to permit them to be raised upwardly about these points, as centers.

The invention consists in the novel features and in the combinations and constructions hereinafter set forth and claimed.

In describing this invention, reference is had to the accompanying drawings, in which like characters designate corresponding parts in all the views.

Figure 1 is a plan view of an automobile chassis to which my bumper is applied, it being shown as applied to both ends thereof.

Figure 2 is a side elevation of parts seen in Figure 1.

Figure 3 is a fragmentary enlarged perspective view of one of the brackets supporting the side members or extensions of the front bumper to the chassis.

Figure 4 is an enlarged fragmentary plan view of parts seen in Figure 3.

Figure 5 is a fragmentary elevation, partly in section, showing the connection between the bracket shown in Figure 3 to the adjacent mud guard or the tire well thereof.

Figure 6 is an enlarged fragmentary elevation of one of the front mud guards showing the slot therein through which the fastening means which secures the side member of the front bumper to the bracket construction shown in Figure 3 extends, particularly showing the construction by which the side extensions have a movement lengthwise of the chassis relatively to the mud guard.

Figure 7 is a perspective view similar to Figure 3 of one of the brackets supporting the rear bumper construction from the chassis.

Figure 8 is a fragmentary plan view, showing in elevation, the joint between the rearwardly extending end of the front transverse bumper member and the front end of each adjacent side bumper member or side elevation.

Figure 9 is a sectional view on line 9—9, Figure 8.

Figure 10 is a detail view of the warning or reflecting signal associated with the joint shown in Figures 8 and 9.

Figure 11 is a transverse fragmentary sectional view through the running board and the adjacent side member or extension of the front bumper where the side extension laps the running board.

Figures 12, 13, and 14 are cross sectional views through the transverse member of the bumper, the tires of the adjacent wheel being also shown, these views showing the different ways of providing the transverse members with convex surfaces toward the tire.

Figure 15 is an enlarged fragmentary side elevation of one of the side members or side extensions of the bumper at the joint between it and the bracket shown in Figure 3, this view showing particularly one form of bolt construction by which the side extension is quickly demounted from the bracket.

Figure 16 is a sectional view taken on line 16—16, Figure 15.

Figure 17 shows a cross sectional view through the portion of the bracket showing the modification in the contour of the outer end of the bracket to eliminate spacers shown in Figure 16.

Figure 18 is a fragmentary end elevation of a portion of the bracket showing the slot therein through which the attaching bolt shown in Figure 15 extends, the slot permitting endwise movement of the bumper and side extension relative to the bracket.

Figure 19 is an enlarged fragmentary perspective view of one of the running boards showing a pivotal joint between the rear end of each side extension and the running board and the slot in the running board for permitting endwise movement of the side extension relative thereto.

Figure 20 is an enlarged sectional view taken on line 20—20, Figure 1, showing particularly the bolt between the extreme end of the curved end portion of each rear bumper and the bracket supporting the rear bumper from the chassis.

Figure 21 is an enlarged fragmentary plan view showing a modification of the mechanism for connecting the side extensions of the bumpers, specifically, the side extension of the front bumper to the running board and operable to quickly detach the side extension from the running board.

Figure 22 is a sectional view taken on line 22—22, Figure 21.

Figure 23 is a sectional view on line 23—23, Figure 21.

Figures 24 and 25 are views similar to Figures 21 and 22 of another form of connection between the side extension of the bumper and the running board, and particularly the connection between the side extension of the rear bumper and the running board, Figure 25 being taken on line 25—25, Figure 24.

Figure 26 is a fragmentary side elevation, parts being omitted of a different form of bumper from that shown in Figure 1, the bumper being shown as of a double bar construction and the bars of the transverse member being shown as folded upwardly in the dotted line position.

Figure 27 is a fragmentary front view of parts seen in Figure 26.

Figure 28 is a cross sectional view taken on line 28—28, Figure 26.

Figure 29 is a side elevation of a rear bumperette type of bumper.

Figures 30 and 31 are views similar to Figures 26 and 27 of another form of two bar bumper construction in which the transverse member only is of two bar construction and the side members of a single bar construction.

Figures 32 and 33 are views similar to Figures 30 and 31 showing another form of transverse bumper member and its connection to the side extension, the transverse bumper member being of single bar construction but waved to increase the overall width thereof to that of a two bar construction.

Figures 34 and 35 are views of other forms of transverse bumper member similar to those shown in Figures 32 and 33.

Figures 36 and 37 are respectively a fragmentary plan or edge view and a front elevation of the corner portions of the bumper shown in Figures 34 and 35.

Figure 38 is a sectional view on line 38—38, Figure 34.

Figure 39 is a sectional view taken on line 39—39, Figure 35.

2 designates the chassis frame; 3 the tire of the front wheel; 6 the tire of the rear wheel; 9 the front mud guard; and 12 the tire well in one of the front mud guards 9. 13 designates the rear mud guard and 16 and 16ᵃ the running boards, these being the conventional elements of the chassis frame, and although the term "running board" is used, it will be understood that it is part of the chassis and that the term includes any other element occupying the position of the running board, as for instance in the event the present type of running boards are eliminated in stream lining.

Each bumper member comprises a transverse end member and side members extending from the ends of the transverse members in a direction lengthwise of the vehicle and being secured at their ends remote from the transverse member to the chassis frame or running board and also to the chassis frame between their ends beneath the mud guards.

17 designates the front transverse bumper member, this having its end portions curved at the front corners of the chassis or vehicle to extend rearwardly, and 18 designates the side extensions, each of which is connected by a joint 25 to the adjacent end of the curved end portion of the transverse members 17, and also connected at their rear ends at 29 to the edges of the running board 16 or 16a and between their ends through bracket connection 23 to the chassis frame independently of the mud guard, the side extensions being connected to the chassis frame and to the running boards to have yielding sliding movement lengthwise of the vehicle and also the connection between the intermediate part of the side members 18 to the chassis being such as to permit another yielding movement at a right angle to the median plane 1 of the chassis frame.

20 designates the rear transverse bumper member and 21 one of the side members or extensions, these being connected at 29 to the running board in front of the rear mud guard and connected to the chassis frame at 27 through a yielding bracket connection 24 located underneath the rear mud guard in rear of the rear wheel 6. The transverse member 20 also has its end portions curved and the extreme ends thereof which extend forward are connected to the side extensions at 27 where the side extensions are connected to the chassis through the bracket 24, that is, the point of connection at 27 serves a dual purpose of connecting the rear transverse member 20 to the side extension 21 and also of connecting the side extension to the bracket 24, while in the front bumper construction, the joint at 26 does not perform this dual function of connecting the side extension through the bracket 23 to the chassis frame and of connecting the transverse front bumper member 17 to the side extension, but on the contrary the front bumper 17 is connected at the extreme ends of its curved end portions by joints as 25 at the front end of each side extension 18. However, both the front and rear bumper constructions are capable of a yielding movement in a direction lengthwise of the chassis and also the side extensions are capable of a yielding inward movement through the brackets 23 and 24 in a direction at a right angle to the median plane 1 of the chassis frame.

The curved ends of the end portions of the transverse member 17 extend from point 5 where the median plane 4 of the front wheel 3 intersects the transverse member 17 when the wheel is straight, to a point intersected by the median plane 4 of the front wheel 3 when turned to its extreme position toward the side member, this being substantially the joint 25. Also, the foremost point of the mud guard is in the transverse vertical plane which intersects the plane 4 when in straight position. Owing to the curved end portions and their location, the mud guard and the wheels are protected by the bumper at all times, and owing to the mounting of the side extension, the force received by the bumpers at the corners thereof is further yieldingly resisted by the mounting of the side extension by which it can move lengthwise of the chassis and also in a direction at a right angle to the median plane 1.

The curved end portions of the transverse members 17 and 20 are preferably convex in cross section, as seen in Figure 9, and of sufficient width or height to extend above the horizontal plane of the axle of the front wheel and also below said axle, although the side extensions 18 extend at a slight downward incline almost in a line diametrically of the axis of the front wheel, and these members 17 are of sufficient width so as to engage the bumper members of other cars when either or both are fully loaded or partly loaded, or one car fully loaded and the other but partly loaded.

The joint 25 between each end of the transverse bumper member 17 and the side extension 18 is shown in detail in Figure 9, wherein the extreme end portion of each side member 17 overlaps the front end of the adjacent extension or side member 18. The extreme ends are rounded at 71 and the rounded or convex ends are fitted to the flat sides of the side extension 18 by suitable washers or spacers 67 filling the convex inner side of the lapping end of the transverse member 17. An antifriction washer or spacer 68 is located between the washer 67 and the front end of the side extension 18.

72 is the shank of the bolt 25 extending through the lapping portions of the members 17, 18 and the interposed spacers or washers, this having a seat or shoulder at 73 on the inner side of the member 18 against which the nut 65 thrusts through a lock washer 66. The bracket 64 (Figure 10) of a warning device or a signal, as a reflecting signal, is mounted on the shank 72 of the bolt, it being provided with a hole 74 for receiving the shank. The bracket 64 is interposed between the lock washer 66 and the inner face of the side extension 18. The bracket 64 is provided with a suitable pin 75 (Figure 10) for extending into an indentation, not shown, in the side extension to hold the bracket from turning. The shank of the bolt is formed with a square portion fitting the opening in the transverse member 17 to prevent the bolt from turning when the side extension 18 is swung about the bolt as a pivot into the dotted line position shown in Figure 2. Also, for the purpose of lubricating the bolt, the side extension 18 is formed with an indentation or groove 70 (Figures 9 and 10) to be filled with oil or grease. This joint, owing to its construction, is rattle and squeak proof and also permits the side extensions to be swung into dotted line position (Figure 2) without developing looseness.

As seen in Figure 11, the ends of the side extensions lapping the running board 16 or 16a are shaped at 76, 77 and 78 to conform to the edge of the running board.

As seen in Figures 12, 13, and 14, each side extension is provided with convex surfaces on their inner faces for contacting with the rubber tire if the front wheels are in an angular position when the impact is received and the bumper flexes or gives enough to bring it into contact with the adjacent wheel. This convexity may be provided in any suitable manner. In Figure 12, the side member is shown as formed with an additional convex strip or strips 79 presented toward the tires of the wheels or the position occupied by the tires when the wheel is turned. In Figure 13, the side extension 18 is formed convex on its inner face by folding the margins inwardly; and as shown in Figure 14, the member 18 is of a single strip convexing inwardly as at 81.

The bracket construction designated generally 23 through which the side extension 18 is connected to the chassis underneath the front bumper consists of a curved member 30, this being right angular in general form with a curve at 31 between the legs thereof sufficient to give it resiliency in a direction crosswise of the chassis frame, one leg of said member being secured to the chassis 2 or the sill thereof and the other or outer end having means for securement to the adjacent side member 18 through the joint 26, this bracket also including an oblique member 36 secured at one end to the chassis or sill 2 above the curved brace member 30 and at its other end to the horizontal leg of the bracket 30 by bolt 38. As shown, the brace member 30 is provided with an upwardly extending lug 32 at its outer end provided with an opening for the shank 84 of the bolt 26 (see Figure 16) and a suitable spacer 83, as of felt, being interposed between the inner concave face of the side extension 18 and the upturned lug 32 of the brace member 30. A nut 87 turns on the inner end of the bolt against the spring washer 88 interposed between the nut and the shoulder 86 on the shank of the bolt 26.

91 is an antifriction spacer or washer interposed between the spacer 83 and the lug 32, this being provided with a groove 90 for lubricant. The bolt 26 extends through an elongated opening or slot 82 in the lug 32 for the purpose of permitting the endwise sliding movement of the side extension 18 relative to the bracket 23 and the head 26 of the bolt is as here shown, in the form of a button or cross bar in order that it may be turned upon loosening of the nut 87 slightly to permit the head of the nut to pass through the slot 82 and thus permit the demounting of the side extension from the bolt. This slot is normally filled by a plug 82ᵃ of yielding material.

The brace assembly 23 also includes a bracket portion 40 connecting it to the adjacent mud guard 9 or the tire well thereof, this having a resilient portion for cushioning any shocks that would otherwise be transferred with its full force to the mud guard 9 through its tire well. This bracket 40 as shown in Figure 5 has a channel shaped portion 41 embracing the lapping outer ends of the brace members 30 and 36 and a rearwardly extending resilient neck portion 44 having its end portion 60 lapping the outer face of the tire well and secured thereto as by a fastening member or rivet 45.

Owing to the curve of the neck portion 46, it is resilient. The channel portion 41 of the bracket 40 is slidably connected to the ends of the brace members 30 and 36 in order not to partake of any movement due to force transferred from the side extension 18 in a direction at a right angle to the median plane 1 of the chassis.

As here shown, it is connected to the lapping end portions of the brace members 30 and 36 by a bolt 47, the bolt 38 having a head. The bolt extends through a slot 34 in the end portion of the member 30 (see Figure 4), and through the bottom of the channel portion 41 of the bracket 40. Suitable antifriction means, as spacers 51 and 52 are interposed between the channel shaped part 40 and the lapping ends of the brace members 30 and 36 in order to allow the parts that are between to slide freely in their relation one to another.

As seen in Figure 4, the skirt or web 10 of the mud guard 9 is connected with an angular extension 42 or lug 42 at the end of the bracket 40, by a bolt 53 (Figures 4 and 6) having a shoulder at 54, the bolt extending through a slot 57 in the web of the mud guard 10 and through a hole 43 in the angular end or lug 42 of the brace member 40 and having a nut 55 threading on its inner end against the stop shoulder 54. Antifriction spacers or washers 58, 59 are interposed between opposing surfaces of the web 10 and the head of the bolt 53 and the angular lug or shoulder 42. This construction permits relative endwise movement of the side extension to the mud guard in order to prevent the transfer of strains received by the side extension to the mud guard.

In Figure 7, the brace assembly 24 for the rear mud guard is shown, this including a curved brace member 30 similar to that shown in Figure 3 in connection with brace assembly 23 and 61 an oblique brace member similar to the brace member 36 (Figure 3). It differs therefrom in that at its outer end, it is provided with a foot portion 62 turned around the edge of the brace member 30 and extending along said edge as a reinforcement along the slot 34. These brace members 30 and 61 are connected together by a bolt similar to the bolt 38 and extending through a slot 34. Suitable antifriction spacers are interposed between the opposing surfaces of the parts 30, 61 and adjacent parts at the points of connection together. This brace assembly 24 is connected to the chassis 2 or sill thereof at 39 the same as the parts 30 and 36 are connected to the chassis in Figure 3. The rear end of each front side extension 18 and the front end of each side extension 21 is connected to the running board to have a sliding movement lengthwise thereof by the bolt 29, the bolt (Figures 19, 20) extending through a lengthwise slot 95 in the flange in the edge of the running board.

Each rear side extension 21 is connected to the brace assembly 24 by a joint similar to that just described connecting the side extension 18 to the brace assembly 23. The joint for each rear side extension is designated generally by the reference numeral 27 and includes a bolt having a shank 96 extending through holes in the lapping portions of the curved ends of the rear bumper 20 and in the side extension 21 and through the lug 32 of the brace member 30 of the rear bracket assembly 24, a nut 101 threading on the reduced inner end of the bolt against the lock washer 102 interposed between the nut and the lug 32; antifriction spacers 103, 104 and 98 on opposite sides of the side extension member 21. A bracket for the reflecting warning device is mounted on the bolt in a manner similar to that shown in Figure 9, and also an oil groove 99 is provided in the side extension 21, the nut 101 thrusting the lug 32 of the rear brace assembly 30 against the bolt 97 at the base of the reduced portion of the bolt, in order that the side extension may not be bound too tightly to be swung upwardly into vertical position, when detached from the running board and to avoid undue loosening of the nut. The bolts 26 and 27 form quick releasable means for detaching the side extensions 18 and 21 in order that they may be swung into upright position as shown in dotted line (Figure 2) for the purpose of giving access to the wheels. However, other quick detachable means may be used as shown in Figures 21, 22, 23, and 24 which embody a spring for normally holding the joint 29 tight and means for unloading the spring in order to permit it to be detached from the joint 29, which, in this instance, is a stud instead of a bolt.

106 designates a coiled tension spring which is hooked at one end through an opening in the member 29 and at its other end to an angular arm of a lever 105 pivoted at 107 on an upright axis to a suitable lug on a bracket piece 105 secured to the under side of the running board, the spring, when the lever is in the position shown in Figure 1, being under tension and passing to one side of the axis of the pivot 107 of the lever. When the lever is operated into the dotted line position (Figure 21) the spring passes to the other side of the dead center line or the axis 107 and is thus unloaded, so that it can be unhooked from the stud 29. This permits the side extension 18 to be demounted. The stud 29 extends through the lapping portions of the side extension 18 and the running board. The point of connection 29 between each of the rear side extensions 21 and the running board may be, as shown in Figures 24 and 25, wherein the spring 106 is connected to the stud 29, as in Figure 21, and to a vertically movable lever 112 pivoted at 113 to a lug 111 on the under side of the running board, the lever being shown in full line position, when the spring is under tension and in dotted line position, when the spring is unloaded to permit its detachment from the stud 29. Suitable antifriction spacers 109 are interposed between the side extension 18 and the running board. The constructions shown in Figures 21 to 25 inclusive show another form of quick-release means other than the studs 29, (Figure 19).

In Figures 26 to 39 are shown modifications falling within the scope of my invention.

In Figures 26, 27, 28, 29, 30, and 31, the transverse bumper members are shown as including a plurality, and here shown as two, transverse bars 115, 116 to the curved end portions of which the side extensions are connected at 25 by a pivotal joint in order to permit the side extensions 117, 118 to be folded upwardly into the dotted line position (Figure 26). In Figure 26, one of these side extensions terminates at the connection 26 while the other extends rearwardly and is connected at 29 to the running board in the way previously described.

In Figures 30 and 31, the transverse bumper member is shown as of the double bar type, the double bars 125 being joined at their ends (see Figure 30) and connected to the front end of the side extension 126 by a single joint 25. In Figures 32 and 33, the transverse member 127 of the bumper is shown as increased in width by assuming an undulated form or formed with undulations 128, 129 and 130, it being secured at its ends to the front ends of the side extension 131 by the joint 25. In order to give a wider impact surface, the extreme undulations 130 being located at the extreme ends of the curved end portions.

In Figure 29, a bumperette construction is shown in which 123 and 124 are the double bars connected together at 140, the curved ends of the bumperette at the corners being connected to the side extension or extensions 119 by joints 25, as in Figure 26 and shown specifically in Figure 28. The joints 25 are similar to the joint 25 previously described and in Figure 28, 115, 116 designate the two transverse members of the double bar bumper; 117 and 118 the upper and lower side extensions of a double bar; 67 spacers within the convex inner faces of the extensions 115, 116. 68 are antifriction washers or spacers. 64 is a bracket for supporting the reflecting warning device 26. 69 and 121 are upper and lower antifriction washers or spacers; 119 the connecting member between the double bar construction and in which the joints 25 are mounted. 122 are upper and lower lock washers around the studs 25; 65 the nuts on the shank 72 of the joint 25. Figures 34 and 35 are another modification, similar to that shown in Figures 32 and 33, the difference being that the width or height of the bumper is increased or the impact surface increased by the use of attaching additional extensions or parts 133 thereto which are secured in position in any suitable manner, as by fastening members 134, as bolts (Figure 9). As shown, these additional parts 133 are provided with a convex base portion nested in the rear convex side of the transverse bar 132 and secured thereto by the bolts 134 and nuts threading thereon against a suitable lock washer, which in turn thrusts against the antifriction spacer 139.

In Figure 34, the side extension 135 adjacent the joint 25 is shown as provided with a widened portion 136 integral therewith, one of the parts 133 shown in Figure 35 is shown as provided in the curved portion at the end of the transverse member and as nested therein, as shown in Figures 36 and 37.

In operation, owing to the curved end portions of the front and rear bumper members and their relation to the corners of the vehicle and to the side extensions, any impact force received from a forward direction or from oblique directions at the corners is absorbed by the curved construction and yieldingly transferred from the side extension to the chassis and the yielding brace assembly 23 or 24 and any lengthwise force is also absorbed due to the fact that the side extension can move lengthwise within limits and are yieldingly resisted. Furthermore, any force received by the front bumpers when the wheels are at an angle is received by the tires and the front wheels if the bumpers yield far enough. Also, owing to the location of the front bumpers to extend an ample distance above and below the horizontal planes of the axles, a maximum protection is given to the wheels, and mud guards, which would otherwise receive the force of the blow. When it is necessary to have access to the wheels for the purpose of changing tires or for any other purpose, the side extensions are readily demountable from the chassis or the brace assembly 23 and 24 and from the running board and can be swung upwardly as indicated in Figure 2. Also, owing to the location of the impact receiving faces of the bumpers, or the width or height thereof, the bumpers are in position to meet or receive the blow from another car similarly equipped in all positions the bumpers of both cars may assume, as for instance, when either is carrying a minimum load or only the driver, and the other is fully loaded, and under any other intermediate load conditions.

What I claim is:

1. The combination with an automobile having the usual frame, wheels, tires, mud guards and running boards, of a bumper including a transverse member having its end portions curved at the corners of the vehicle, so that its extreme ends point in a direction lengthwise of the vehicle, side members pivoted at like ends to said ends of the transverse member, a yielding bracket construction carried by the frame beneath the adjacent mud guard, each of the side members being connected between its end to the adjacent bracket construction and being slidably connected to the edge of the running board and quick detachable means connecting each side member to the bracket construction and the adjacent running board.

2. The combination with an automobile having the usual frame, wheels, tires, mud guards and running boards, of a bumper including a transverse member having its end portions curved at the corners of the vehicle so that its extreme ends point in a direction lengthwise of the vehicle, side members pivoted at like ends to said ends of the transverse member, a yielding bracket construction carried by the frame beneath the adjacent mud guard, each of the side members being connected between its end to the adjacent bracket construction and being slidably connected to the edge of the running board, quick detachable means connecting each side member to the bracket construction and the adjacent running board, and a yielding connection between the bracket construction and the adjacent mud guard tending to resiliently resist force applied and transferred by the side member in a direction lengthwise of the vehicle.

3. The combination with an automobile having the usual frame, wheels, tires, mud guards and running boards, of a bumper comprising a transverse end member and longitudinal side members extending in a diametrical direction across the wheels on the outer side thereof, the transverse members having their end portions curved at the corners of the automobile pointing in a direction lengthwise of the automobile and the side members being pivotally connected to said ends which are pointed lengthwise of the automobile, brackets located underneath the mud guards on which the side members are detachably mounted, the side members also extending lengthwise of the automobile from said bracket connection and being connected to the edges of the running board, and the portions thereof contiguous to the running board being at the level of the running board, said brackets being resilient and yieldable in a direction at a right angle to the longitudinal median plane of the frame and the side extension being connected to the running board to shift bodily endwise thereof.

4. The combination with an automobile having the usual wheels, tires, mud guards and running boards, of a bumper comprising a transverse end member and longitudinal side members, the transverse member having its end portions curved from a point in advance of the adjacent mud guard and in line with the median plane of the adjacent wheel around to the outer side of the wheel to a point in a transverse vertical plane of the foremost edge of the wheel and mud guard, the side members forming side extensions of said curved ends and being secured to the edges of the running boards, whereby the central median plane of each wheel intersects said curve of the adjacent transverse bumper in front of the pivotal connection between the curved end and the side member near the extreme ends of the curve when the wheel is in straight or in one of its extreme turned positions.

5. The combination with an automobile including the usual wheels, chassis, frame having mud guards and running boards; of a bumper comprising a transverse rigid member extending across one end of the chassis and longitudinal rigid members extending along the sides of the chassis, the transverse member being connected at its ends to the longitudinal members, and the longitudinal members being connected to the chassis to have a yielding movement longitudinally of the chassis and said side members being also connected between their ends to the chassis, to have a yielding transverse movement relative to the chassis.

6. The combination with an automobile having the usual frame, wheels, tires, mud guards and running boards, of a bumper comprising a member extending transversely of the end of the automobile, and side members, the end portion of the transverse member curving outwardly and in a direction lengthwise of the vehicle, means for securing the side member intermediate of its ends to the chassis independently of the bumper, said means being resilient permitting a yielding movement of said member toward and from the chassis independently of the mud guard and said side member being secured to the running board at its end remote from the transverse member and being secured to the former means and to the running board to have a yielding movement in a direction lengthwise of the frame.

7. The combination with an automobile having the usual frame, wheels, tires, mud guards and running boards, of a bumper comprising a member extending transversely of the end of the automobile, and side members, the end portion of the transverse member curving outwardly and in a direction lengthwise of the vehicle, means for securing the side member to the chassis independently of the bumper, said means being resilient permitting a yielding movement of said member toward and from the frame independently of the mud guard and said side member being secured to the running board at its end remote from the transverse member and being secured to the former means and to the running board to have a yielding movement in a direction lengthwise of the chassis, and releasable means for securing the side members to the bracket means and to the running board.

8. The combination with a vehicle, of a bumper comprising a transverse member and longitudinal side members, the transverse member having its end portions curved around the corner portions of the vehicle, and the adjacent portions of the steering wheels extending into the space circumscribed by said curving portions in position to be engaged by the steering wheels, when turned to an extreme position, and the curved portions extending above the horizontal plane of the axis of the adjacent wheels and being convex on the inner side toward the tires of the adjacent wheels.

9. The combination with an automobile having the usual frame and wheels, of a bumper comprising a transverse member having its end portions curved at the corners of the vehicle, and its ends extending in a direction lengthwise of the vehicle, side members connecting the like ends of the curved ends of the transverse member and being connected to the frame to have a transverse yielding movement, and a bodily shifting yielding sliding movement lengthwise of the frame.

LEWIS J. MORGAN.